Feb. 11, 1947.　　M. A. STICELBER　　2,415,711
REFRIGERATED DOUGH MIXER
Filed May 3, 1943
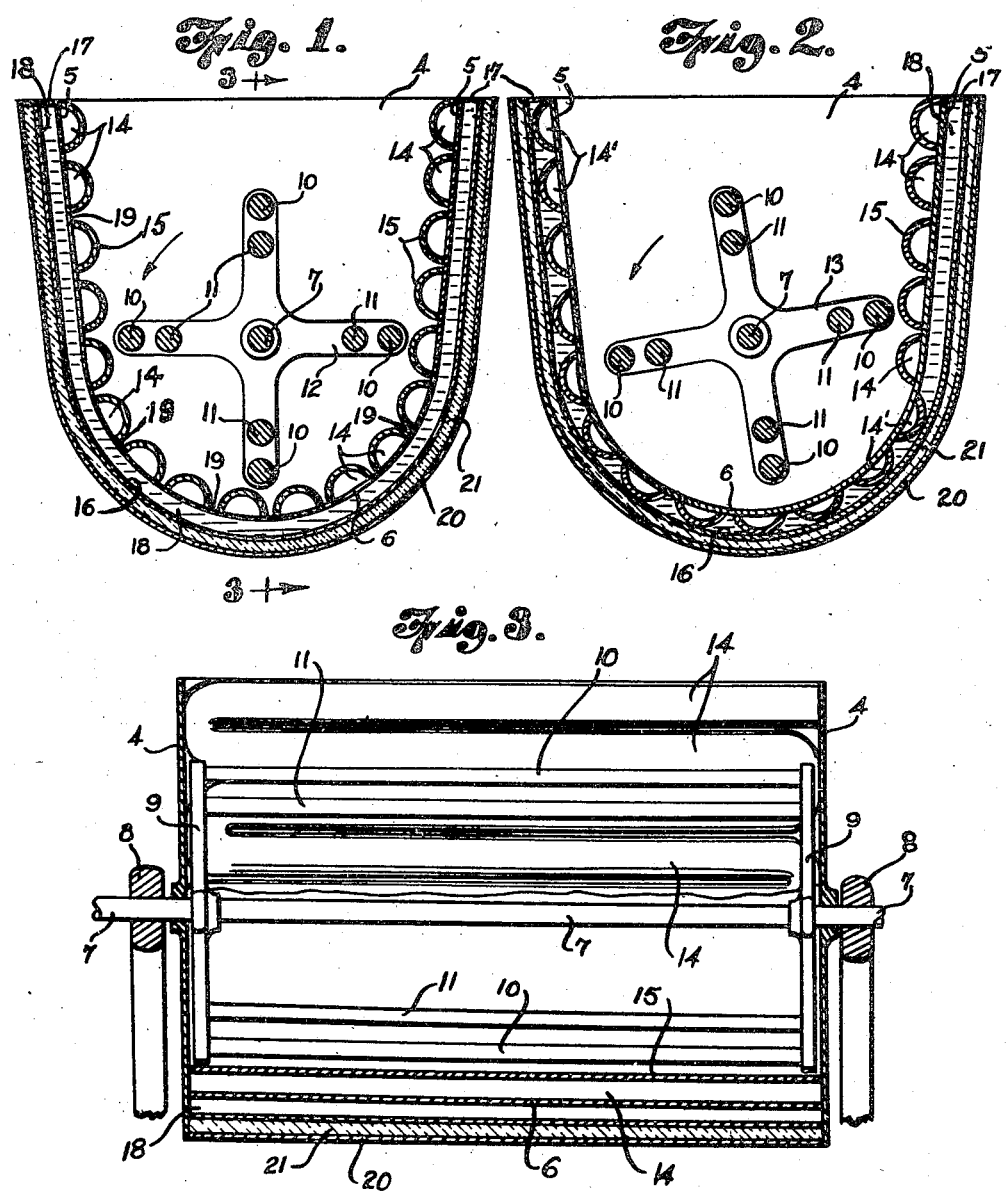
INVENTOR
MERLIN A. STICELBER
BY Alfred R. Fuchs
ATTORNEY Patented Feb. 11, 1947

2,415,711

UNITED STATES PATENT OFFICE 2,415,711

REFRIGERATED DOUGH MIXER

Merlin A. Sticelber, Kansas City, Mo., assignor to Quik-Seal, Inc., a corporation of Missouri Application May 3, 1943, Serial No. 485,412

17 Claims. (Cl. 62—1)

1

My invention relates to dough mixers, and more particularly to a refrigerated dough mixer.

It is a purpose of my invention to provide a dough mixer that is capable of mixing sponges or doughs with greater efficiency than has been previously possible, thus saving a considerable amount of power and also, due to the fact that the doughs or sponges can be mixed in a shorter period of time than prior to this invention, saving manpower.

It is another purpose of my invention to provide a dough mixer that provides a better gluten development in the dough and greater absorption of water, making it possible to use more water in the dough.

It is another important purpose of my invention to provide a refrigerated dough mixer that is provided with means for refrigerating the same that is more efficient than refrigerating means previously utilized and which at the same time provides the above referred to advantages of saving of power and time, and of producing a better dough containing more moisture and having a better gluten development.

I have found that by providing the wall of the dough mixer with which the dough or sponge comes in contact while the same is being mixed due to the action of the agitator in the dough mixer, with cooling means on the inner face thereof, providing an undulating or irregular wall surface, instead of the smooth wall surface previously provided, a greater cooling surface is provided in contact with the dough, which is repeatedly engaged with said wall, and the slippage of the dough over the ordinarily provided smooth wall of the dough mixer, is avoided, thus providing a more decided pulling action and kneading action by means of the agitator than is possible with dough mixers that are not provided with my improvement. By providing a combined cooling means and dough gripping or movement retarding means, both more efficient cooling of the dough or other contents of the mixer, and better and quicker mixing of the dough takes place. The area of the wall with which the dough contacts that is provided with the cooling means on the inner face thereof, that provides the undulating or irregular surface, may be varied in accordance with the amount of cooling of the dough that may be required, as the cooling means has such high efficiency that it is not desirable in some mixers to have the entire dough contacting wall provided with such cooling means on the inner face thereof, but only a portion thereof. It is important, however, that the cooling means,

2 at the wall portion of the mixer where the agitator arms recede from or move away from the said wall in the rotation of the agitator, be provided with conduit means that forms the gripping or retarding means for the movement of the dough located on the inner face of said wall at and near the point where the agitator arms commence to move away from the wall, so that a very desirable pulling action will be exerted by means of said agitator members in combination with the holding means provided by the lengths of cooling conduit projecting from the inner face of said wall.

Other objects and advantages of my invention will appear as the description of the drawing proceeds. I desire to have it understood, however, that I do not intend to limit myself to the particular details shown or described, except as defined in the claims.

In the drawing:

Fig. 1 is a vertical sectional view through the mixing chamber of a dough mixer and associated parts, taken transversely to the axis of rotation of the agitator, showing one form of my invention.

Fig. 2 is a view similar to Fig. 1, showing another form of my invention, and

Fig. 3 is a section through the bowl taken substantially on the line 3—3 of Fig. 1, the agitator being in elevation, the portions of the mechanism exteriorly of the mixing chamber, and the cooling coil being partly broken away.

Referring in detail to the drawing, a dough mixer having a mixing chamber provided with end walls 4 and a wall connecting said end walls, provided with substantially straight slightly diverging portions 5 and a curved portion 6 is shown, said wall portions 5 and 6 constituting a transverse shell portion connecting the end walls 4. Extending between said end walls 4 and through the same is a shaft 7, which is mounted on suitable bearing supports 8 in a well known manner, said shaft supporting the mixer chamber or bowl in a manner that the same can be tilted about the axis of the shaft 7 to dump the contents thereof in a well known manner.

Mounted on the shaft 7 so as to rotate therewith is an agitator, the design of which may vary in accordance with the requirements of the baker, one common form of agitator being illustrated, which comprises spiders 9 that are fixed to said shaft 7, on the arms of which are mounted rod-like members 10 and 11 that extend substantially in parallelism to the shaft 7 and substantially in parallelism to each other, the same being shown as being circular in cross section. While it is preferred, for purposes of this invention, that at least the outer longitudinally extending members 10 of the agitator are straight and closely adjacent the outer ends of the arms of the spiders 9, these need not be of the cross section shown. The agitator rotates in the direction indicated by the curved arrows in Figs. 1 and 2, so that the arm 12 of the spider shown in Fig. 1 is leaving the adjacent wall portion 5 of the dough mixer, while the arm of the spider opposite thereto is approaching the opposite wall portion 5, and in a similar manner the arm 13 of the agitator shown in Fig. 2 is leaving the wall portion 5 while the arm opposite thereto has approached the opposite wall portion 5 of the dough mixer and will move in a path that is at a substantially constant distance from the curved wall portion 6 until the junction of the wall portions 5 and 6 at the right hand side of Fig. 2 is reached by said arm in its rotation in the direction of the arrow.

In the form of the invention shown in Fig. 1 I have provided a refrigerant conduit made up of a plurality of spaced conduit portions 14, which are shown as being, and preferably are, channel shaped in cross section, each having a curved wall portion 15 that is arranged with its convex side away from the wall portions 5 and 6 and toward the mixing chamber, and with the edge portions of said channels secured in liquid tight relation to said wall portions 5 and 6. The channel members are, preferably, welded in liquid tight relation to said wall portions 5 and 6, so as to rigidly secure the same in fixed position to the dough mixer wall. The conduit portions 14 are connected in series so as to provide a single circuitous passage for the refrigerant from the uppermost conduit portion 14 at the top end of one wall portion 5 to the uppermost conduit portion 14 at the top end of the other wall portion 5. Inasmuch as the curved wall portions 15 are arranged with the convex sides thereof toward the mixing chamber, and inasmuch as the channel members providing the conduit portions 14 are spaced slightly from each other, said conduit portions 14 collectively form an undulating or corrugated or ribbed inner surface for the dough mixer wall, with which the dough comes in contact during the mixing operation.

The conduit portions 14 are, preferably, connected alternately at opposite ends to each other so that a continuous circuitous passage, from the uppermost conduit portion 14 on the one wall portion 5 to the uppermost conduit portion 14 on the other wall portion 5, is formed, with the refrigerant fluid passing in opposite directions in adjacent passages, one form of connection for such conduit portions being shown in Fig. 3. The refrigerant fluid enters, of course, through the end of the uppermost conduit portion, at one end of the series, that is not connected with the next adjacent conduit portion 14 and leaves the refrigerant expansion coil through the end of the conduit portion 14, at the other end of the series, not connected with the adjacent conduit portion 14. Any suitable arrangement of conduits for leading the refrigerant to and from the expansion coil may be provided and any suitable controls for the flow of the refrigerant to maintain the desired temperature of the refrigerated wall with which the dough contacts, or of the dough itself, can be provided.

The shell portion of the mixing chamber comprising the inclined wall portions 5 and the curved wall portion 6 is, preferably, provided with a liquid tight jacket on the outer side thereof formed by said wall portions 5 and 6, and a wall 16 corresponding substantially in shape to the wall having the portions 5 and 6 and spaced therefrom a substantially uniform distance, and the wall portions 17, which, together with the walls 4, complete the chamber thus provided for a liquid 18, with which the jacket is, preferably, filled. Said liquid 18 is, preferably, an oil or similar liquid that has a freezing point considerably below the freezing point of water, so that it will always remain in a liquid condition, thus providing a very uniform refrigerated effect over the entire wall made up of the portions 5 and 6, the portions 19 of the walls 5 and 6 between the refrigerant conduit portions 14 thus being maintained at a temperature that is substantially that of the walls of the refrigerant conduits 14.

Preferably, an outer jacket 20 is also provided and heat insulating material 21 is provided between said outer jacket and the wall 16 of the jacket containing the liquid 18. While the refrigerant conduit members or portions 14 are shown as being arranged over the entire inner wall of the shell from the top edge of the one wall portion 5 to the top edge of the other wall portion 5, this may not be found to be absolutely necessary in practice, as the mixer is, of course, not filled completely with dough during the mixing operation. However, in the form of the invention shown in Figs. 1 and 3 the entire cooling coil or refrigerant expansion coil is located on the inner face or surface of the mixer wall with which the dough contacts during the mixing operation. It will be noted that by the provision of the slightly spaced refrigerant conduits 14 presenting convex surfaces toward the interior of the mixing chamber, a ribbed or corrugated effect is provided for the entire wall of the mixer, with which the dough contacts during the mixing operation and over which it moves due to the action of the arms of the agitator. While only one arm of the spider was referred to above in describing the movement of the parts relative to the wall portions 5 and 6, and thus to the cooling element thereon, it is, of course, understood that there are two such spiders or arms, one on each end of the agitator, and that the outermost rod-like member 10 connecting these arms has the same relationship to the wall portions 5 and 6 during the rotation of the agitator as does the pair of arms upon which it is mounted.

The agitator rotating in the direction indicated by the arrow in Fig. 1 will cause the dough to be carried over the corrugations or undulations, thus provided on the inner surface of the mixing chamber, and as an arm such as that designated by the numeral 12 in Fig. 1, leaves the wall of the mixing chamber in its rotative movement, the bar or rod-like member 10 will exert a decided pull on the dough that is being mixed due to the retarding or gripping effect exerted by the irregular surface provided by the spaced conduit portions 14 adjacent the pair of arms 12 on which the rod-like member 10 is mounted. Also, as the dough is carried by the agitator over the surface of the conduits 14 a very great amount of cooling of the dough is accomplished, as a much greater cooling surface is provided in contact with the dough and the dough is in contact with such surface longer than if the cooling elements are provided on the outer side of the mixing chamber wall, as shown at the left and at the bottom of Fig. 2.

Both the maximum cooling and retarding effect would, of course, be obtained by the arrangement shown in Fig. 1, but most of the desirable features of the invention can be obtained by the arrangement of cooling medium conduits shown in Fig. 2, this showing substantially the minimum number of cooling conduits that should be provided on the inner face of the mixing chamber to get the desired results that the applicant has obtained. It may be found desirable in practice to have part of the refrigerant expansion element on the outside of said wall and part of it on the inside thereof, as shown in Fig. 2, and the proportion of the dough mixer wall or shell that has the cooling conduits on the inside thereof to which has the cooling conduits on the outside thereof, may be varied in accordance with the cooling effect and the retarding or kneading effect that may be found the most desirable for the particular use to which the mixer is to be put. In Fig. 2 the parts that carry the same numerals as in Figs. 1 and 3 correspond to the parts bearing those numerals in said Figs. 1 and 3. The agitator is shown as being of the same character as in Figs. 1 and 3, and the liquid jacket containing the liquid 18 is provided, as well as the outer jacket 20 for retaining the heat insulating material 21 in position. The cooling element is made up of conduit portions 14, as previously described, located on the inner face of the inclined wall portion 5 on the side of the shell or dough contacting wall of the mixer at which the arms and rod-like members 10 and 11 of the agitator are moving away from the mixer wall, while the remainder of the mixer wall comprising the curved bottom wall portion 6 and the inclined wall portion 5 on the opposite side of the shell of the mixer has the refrigerant conduits 14' provided on the outer surface thereof, said conduits being channel-shaped in cross section with the longitudinal edges thereof secured in liquid tight relation to said wall portions 5 and 6, preferably, by welding. The conduits 14 are, of course, connected in series in the manner previously described and the last conduit 14 is connected in series with the conduit 14' adjacent thereto and all said conduits 14' are connected in series in the same manner as was described in connection with the conduits 14. Preferably, the refrigerant enters the cooling element through one end of the topmost conduit 14, and leaves through one end of the topmost conduit 14' on the opposite wall.

The arrangement of the refrigerant conduits on the inner face of the mixer wall over the desired area thereof has been found to reduce the length of time that sponges have to be mixed to obtain the same development of the sponge as much as 35%, the same agitator being used as in a smooth walled mixer of the same capacity and otherwise a duplicate of the mixer requiring the shorter mixing period, except for the particular arrangement of cooling elements provided on the inner face of the wall thereof. In a similar manner a saving of 27% in the mixing time is obtained in mixing a dough in a mixer provided with my improved cooling means on the inner face thereof with the same gluten development. A greater amount of water is also absorbed, making it possible to use more water in the dough, which is desirable, as it produces a better finished product, these results being due to the combined cooling and retarding effect obtained by my cooling conduits arranged on the inner face of the mixer wall. While a much greater refrigerating effect can be obtained by the arrangement of the conduits on the inner surface of the wall over the entire length of the expansion element or refrigerating coil, it is not desirable to place the entire coil on the inside of the mixer wall unless this is found to be necessary from the standpoint of refrigeration, as the provision of the refrigerant conduits on the outer face of the mixer wall is simpler from a construction standpoint than on the inner face thereof and where as much cooling as can be obtained by providing the refrigerant conduits all on the inner face of the wall is not necessary, it is desirable to place only a portion thereof on the inner side of the wall, because of the saving in cost and avoidance of construction difficulties thereby, and because a smooth inner surface is desired on the side of the mixer on which the contents are discharged to facilitate unloading the mixer.

What I claim is:

1. In a mixer, a mixing chamber having an agitator therein, said chamber having a wall adjacent the path of movement of said agitator, cooling means for said wall comprising cooling conduits on the inner face thereof providing resistance to the movement of the material agitated due to said agitator.

2. In a mixer, a mixing chamber having an agitator therein, said chamber having a wall adjacent the path of movement of said agitator, cooling means for said wall comprising cooling medium conduits projecting inwardly from said wall and collectively providing a corrugated inner surface on said wall.

3. In a mixer, a mixing chamber having an agitator therein and having a wall with which said agitator engages material being agitated thereby to move said material along said wall in a predetermined direction and cooling means for said wall comprising conduits projecting inwardly from said wall transversely of the direction of movement of said material.

4. In a mixer, a mixing chamber having an agitator therein having arms moving in a circular path and having a wall with which said agitator engages material, said wall having a portion from which said arms recede while traveling upward in their rotative movement, said wall portion being provided with combined dough gripping and cooling means.

5. In a dough mixer, a mixing chamber having an agitator therein rotating about a fixed axis in a predetermined direction, and having arms moving in a circular path within said chamber, said mixing chamber being shaped to provide a wall portion with which said agitator engages dough and from which said arms recede while traveling upwardly in their rotative movement, said wall portion being undulating and cooled.

6. In a dough mixer, a mixing chamber having a wall, means in said chamber for repeatedly contacting a mass of dough with said wall, and refrigerating means for said wall comprising a plurality of spaced refrigerant conduits projecting from the inner face thereof and providing a corrugated inner surface on said wall.

7. In a dough mixer, a mixing chamber having a wall, means in said chamber for repeatedly contacting a mass of dough with said wall, and refrigerating means for said wall comprising a refrigerant expansion chamber on the inner face of said wall and on the outer face of said wall.

8. In a dough mixer, a mixing chamber having a wall, means in said chamber for repeatedly contacting a mass of dough with said wall, and refrigerating means for said wall comprising a refrigerant expansion chamber partly on the outer face of said wall and partly on the inner face of said wall.

9. In a dough mixer, a mixing chamber having a wall, means in said chamber for repeatedly contacting a mass of dough with said wall, and refrigerating means for said wall comprising a refrigerant expansion chamber lying entirely on the inner side of said wall and providing a corrugated inner surface on said wall.

10. In a dough mixer, a mixing chamber having a wall, means in said chamber for repeatedly contacting a mass of dough with said wall, and refrigerating means for said wall comprising a refrigerant expansion chamber having a portion thereof lying on the inner side of said wall and providing a corrugated inner surface on said wall.

11. In a dough mixer, a mixing chamber having a wall, means in said chamber for repeatedly contacting a mass of dough with said wall, and refrigerating means for said wall comprising a plurality of spaced refrigerant conduits connected in series projecting from the inner face thereof and collectively providing a corrugated inner surface on said wall.

12. In a dough mixer, a mixing chamber having an agitator therein, and having a cooled wall with which said agitator engages dough, said cooled wall being undulating throughout the area of said wall engaged by said dough to provide a plurality of parallel, adjacent ribs extending transversely of the direction of movement of the dough engaging said wall, said ribs collectively forming a corrugated inner surface on said wall.

13. In a mixer, a mixing chamber having an agitator therein, said chamber having a wall adjacent the path of movement of said agitator, cooling means for said wall comprising cooling medium conduits projecting inwardly from said wall, and means providing a liquid tight jacket containing a liquid having a lower freezing point than water on the outer side of said wall.

14. In a mixer, a mixing chamber having an agitator therein and having a wall with which said agitator engages material being agitated thereby to move said material along said wall in a predetermined direction and cooling means for said wall comprising conduits projecting inwardly from said wall transversely of the direction of movement of said material, and means providing a liquid tight jacket containing a liquid having a lower freezing point than water on the outer side of said wall.

15. In a mixer, a mixing chamber having an agitator therein and having a wall with which said agitator engages material, said wall being provided with combined dough gripping and cooling means over the entire inner surface thereof.

16. In a dough mixer, a mixing chamber having a wall, means in said chamber for repeatedly contacting a mass of dough with said wall, and refrigerating means for said wall comprising a plurality of spaced refrigerant conduits projecting from the inner face thereof, and means providing a liquid tight jacket containing a liquid having a lower freezing point than water on the outer side of said wall.

17. In a dough mixer, a mixing chamber having an agitator therein having arms moving in a circular path, said chamber having an undulating cooled wall portion from which said arms recede while traveling upwardly in their rotative movement and with which said agitator engages dough, said wall portion providing a plurality of rounding closely spaced ribs extending transversely of said wall portion to provide a corrugated cooled surface on said wall portion cooperating with said arms to exert a pulling action on said dough.

MERLIN A. STICELBER.

REFERENCES CITED

The following references are of record in the file of this patent:

UNITED STATES PATENTS

| Number | Name | Date |
| --- | --- | --- |
| 1,426,444 | Allison | Aug. 22, 1922 |
| 1,988,561 | Lauterbur et al. | Jan. 22, 1935 |
| 2,011,494 | Lauterbur | Aug. 13, 1935 |
| 2,099,937 | Lauterbur | Nov. 23, 1937 |
| 2,274,220 | Sticelber | Feb. 24, 1942 |
| 2,315,230 | Sticelber | Mar. 30, 1943 |